(12) United States Patent
Jain

(10) Patent No.: US 7,725,377 B2
(45) Date of Patent: May 25, 2010

(54) PERSONALIZED WEALTH MANAGEMENT

(75) Inventor: Kamal Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/144,674

(22) Filed: Jun. 24, 2008

(65) Prior Publication Data

US 2009/0319438 A1 Dec. 24, 2009

(51) Int. Cl.
*G06Q 40/00* (2006.01)
(52) U.S. Cl. .................................................. 705/35
(58) Field of Classification Search ............... 345/440; 463/25; 705/35–45, 14.2; 709/231; 725/116; 714/4; 717/101
See application file for complete search history.

(56) References Cited

U.S. PATENT DOCUMENTS

| | | | |
|---|---|---|---|
| 7,315,837 B2* | 1/2008 | Sloan et al. ............... | 705/36 R |
| 7,343,336 B1 | 3/2008 | Gottstein | |
| 7,373,324 B1* | 5/2008 | Engin et al. ............... | 705/36 R |
| 7,577,597 B1* | 8/2009 | Allison et al. ................ | 705/35 |
| 7,640,200 B2* | 12/2009 | Gardner et al. ............ | 705/36 R |
| 2001/0042037 A1* | 11/2001 | Kam et al. .................... | 705/36 |
| 2002/0038271 A1* | 3/2002 | Friend et al. .................. | 705/36 |
| 2002/0143680 A1* | 10/2002 | Walters et al. ................ | 705/36 |
| 2002/0147672 A1 | 10/2002 | Gaini | |
| 2003/0120575 A1* | 6/2003 | Wallman ..................... | 705/36 |
| 2003/0208427 A1* | 11/2003 | Peters et al. .................. | 705/36 |
| 2005/0010510 A1* | 1/2005 | Brose et al. .................. | 705/35 |
| 2005/0097022 A1* | 5/2005 | Silman ......................... | 705/36 |
| 2005/0234789 A1 | 10/2005 | Czyzewski | |
| 2006/0074788 A1* | 4/2006 | Grizack et al. ................ | 705/35 |
| 2006/0143099 A1 | 6/2006 | Partlow | |
| 2007/0208650 A1 | 9/2007 | McGill | |
| 2007/0239582 A1* | 10/2007 | Tyson ........................ | 705/36 R |

FOREIGN PATENT DOCUMENTS

| | | |
|---|---|---|
| EP | 1072990 A2 | 1/2001 |
| WO | 2007089234 A1 | 8/2007 |

OTHER PUBLICATIONS

Selecting Your Endowment Investment Advisor, Pydych, Charles P., American School and University v53 n6 p. 50-53, Feb. 1981.*
"Financial Advisor—Personal Financial Tools and Calculators", 2 Pages, Copyright: 2007, http://www.othersoft.co.za/fadvisor.htm.
Arnott, et al. "Loss Harvesting: What's It Worth to the Taxable Investor?", Date: 2001, 15 Pages.
Calif, et al. "Banco BBA and Ascent Financial Technologies Customize FEA Analytics for Brazilian Financial Markets", Date: Mar. 14, 2002, 2 Pages.

* cited by examiner

*Primary Examiner*—Mary Cheung
*Assistant Examiner*—Tien C Nguyen

(57) ABSTRACT

Described herein is a system that includes a receiver component that receives personal preferences of a user regarding wealth management. The receiver component can further receive first wealth management advice from a first financial expert that has been selected by the user. Additionally, the system may include a customization component that automatically modifies the first wealth management advice from the first financial expert based at least in part upon the received personal preferences of the user to generate first personalized wealth management advice. The system may additionally include an output component that outputs the personalized wealth management advice to the user.

20 Claims, 12 Drawing Sheets

PERSONALIZED WEALTH MANAGEMENT

BACKGROUND

Computers and networks in general, and the Internet in particular, have at least partially changed how individuals manage their finances. For instance, an individual with an Internet connection can check balances in checking accounts, savings accounts, credit cards, mortgages, automobile loans, and the like. Additionally, an individual can transfer monies from a first account to a second account with a few keystrokes and mouse clicks.

In addition, individuals can research companies online and make educated decisions regarding which companies to invest in. Still further, individuals can use websites to trade securities, including stocks, mutual funds, index funds, and other financial instruments. For instance, an individual may log onto a website and purchase shares of stock rather than having to use a stock broker. Thus, managing finances has become more efficient with the advent of computing and the Internet.

Financial management is a large component of the economy, accounting for billions of dollars in taxable revenue each year. Many individuals depend upon mutual funds to manage their long-term finances, as mutual funds can diversify their portfolio and are managed by financial experts. Typically, for a certain type of investment, mutual fund managers attempt to maximize possible return while minimizing risk. The balancing of risk and return, however, is undertaken for a general population, and does not take into consideration special circumstances surrounding individual investors. For instance, a mutual fund manager may invest heavily in company A. A particular individual, however, may be employed by company A and may have stock options for company A—accordingly, the individual is already financially tied to company A. Conventionally, if the individual desires to avoid compounded risk, the individual does not invest with the mutual fund manager.

SUMMARY

The following is a brief summary of subject matter that is described in greater detail herein. This summary is not intended to be limiting as to the scope of the claims.

Described herein are various technologies pertaining to wealth management. More particularly, generation and/or maintenance of a customized investment portfolio is described herein. Conventionally, only the most affluent can afford to employ a personal financial manager to aid with investing choices. The average investor often relies upon mutual funds, index funds, or other funds to diversify their investment portfolio. With respect to mutual funds, for instance, a mutual fund manager typically selects holdings to include in a fund for the benefit of the general population. Portions of such funds, however, may not be advantageous for a particular user. Accordingly, as described in detail herein, expertise of a mutual fund manager or other financial expert can be leveraged and automatically modified to generate a customized investment portfolio for the user that takes into consideration financial preferences of the user.

More particularly, financial preferences of a user can be received, wherein the financial preferences may be explicitly provided by the user, inferred from other data pertaining to the user, etc. For instance, the user may be employed at a particular company, and therefore may not wish to invest further in such company (since the financial health of the user is already strongly tied to the company). In addition, the user may identify a financial expert, and the identified financial expert may provide wealth management advice. In an example, the financial expert may be a mutual fund manager that provides financial advice (e.g., selects holdings for a mutual fund) for a large population of people. Thus, the wealth management advice may include advice to purchase a variety of different investments in certain percentages of an investment amount. Further, the wealth management advice may include advice to alter holdings in the mutual fund.

The wealth management advice received from the financial expert may be automatically modified to create personalized wealth management advice for the user. Specifically, the wealth management advice received from the financial expert may be modified based at least in part upon the personal financial preferences of the user. Such modification may act to reduce overall risk to the user without adversely affecting possible returns (e.g., maximize a risk/return ratio). The user may then choose to invest in accordance with the personalized wealth management advice.

Furthermore, purchases of investments may be undertaken automatically or semi-automatically based at least in part upon the personalized wealth management advice. For instance, mutual fund managers often alter holdings in mutual funds that they manage. These alterations are typically transparent to an investor in the mutual funds. Thus, if the financial expert selected by the user is a mutual fund manager, the user may be provided with a mutual fund that is customized based at least in part upon personal financial preferences of the user. When the mutual fund manager recommends alterations in holdings, these alterations may be modified and automatically undertaken.

Other aspects will be appreciated upon reading and understanding the attached figures and description.

DETAILED DESCRIPTION

Figure 1:
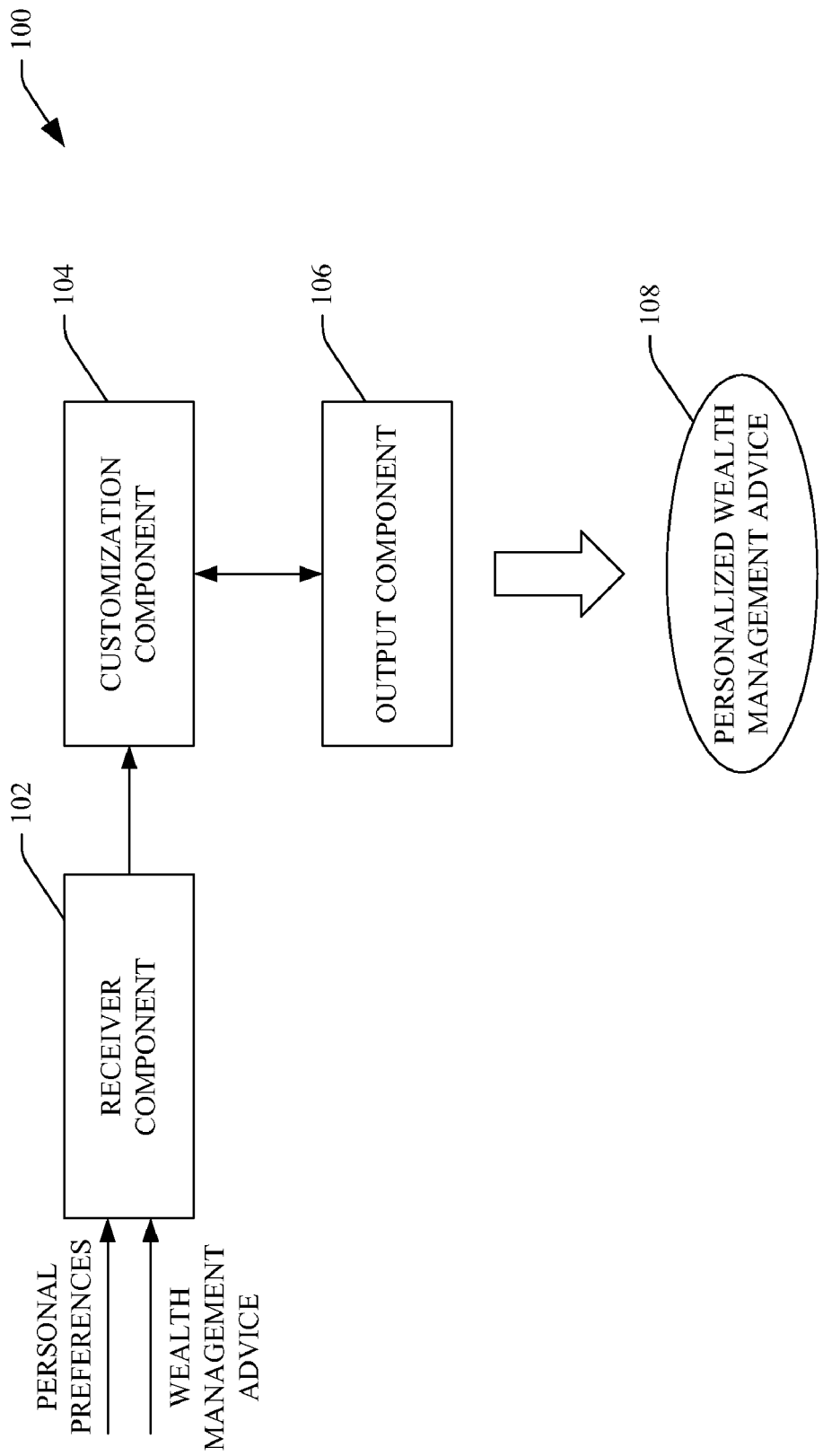
FIG. 1 is a functional block diagram of an example system that facilitates determining personalized wealth management advice for a user.

Various technologies pertaining to wealth management in general, and personalized wealth management in particular, will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates generating and maintaining a personalized investment portfolio for a user is illustrated. The system 100 may include a receiver component 102 that receives personal investing preferences of a user. For instance, such personal investing preferences may include risk tolerance, a threshold on an amount of money that is to be invested in a particular security and/or fund, a threshold on a total percentage of a portfolio that is to be invested in a particular security and/or fund, a prohibition against investing in one or more funds, and/or other information.

The receiver component 102 may also receive wealth management advice from a financial expert that has been selected by the user. Pursuant to an example, the wealth management advice from the financial expert may be advice provided to a general population by the financial expert. The financial expert may be any suitable expert in the financial field. For instance, the financial expert may be a mutual fund manager, a hedge fund manager, an author, a television personality, or any other suitable financial expert. In an example, the user may, through research, determine that a particular mutual fund has performed well over time. Further, the user may select such mutual fund and, by extension, select the manager of the mutual fund. The wealth management advice provided by the financial expert may be advice to purchase securities, advice to sell securities, advice to sell short securities, advice to trade securities, and/or any other suitable wealth management advice. Pursuant to an example, if the financial expert is a mutual fund manager, the initial advice of such financial expert may be to purchase securities that are included in the mutual fund managed by the financial expert. As the financial expert alters funds in mutual fund, the wealth management advice received by the receiver component 102 can likewise alter. For instance, if the financial expert trades out of a certain security in the mutual fund managed by such financial expert, the received wealth management advice will be to trade out of the certain security. Accordingly, the receiver component 102 can receive wealth management advice from a financial expert in real-time.

The system 100 additionally includes a customization component 104 that automatically modifies the wealth management advice from the financial expert based at least in part upon the received personal investing preferences of the user to create personalized wealth management advice 106 for the user. For example, the financial expert may manage a mutual fund that includes one hundred different securities, wherein each security makes up one percent of the mutual fund. The personal investing preferences of the user, however, may include a prohibition against investing in one of the securities in the mutual fund. Accordingly, the customization component 104 can customize the wealth management advice such that the wealth management advice includes recommendations to create a customized mutual fund that includes ninety nine securities, wherein each of the securities makes up approximately 1.01 percent of the mutual fund. The customization component 104 can further alter the personalized wealth management advice 106 upon alterations in the wealth management advice provided by the financial expert and/or upon alterations in the personal investing preferences of the user.

The system 100 may additionally include an output component 108 that outputs the personalized wealth management advice 106. For instance, the output component 108 may output the personalized wealth management advice 106 to a computer-readable medium. In another example, the output component 108 may output the personalized wealth management advice 106 to a graphical user interface. In still yet another example, the output component 108 can output the personalized wealth management advice 106 to a microphone or printer.

As can be discerned from the above, the system 100 may be used to, in essence, personalized wealth management advice that facilitates creation of one or more personalized mutual funds for a user. For instance, a user may be employed at company A and have stock options with company A. Accordingly, a significant amount of financial well-being of the user is tied to the performance of company A, and therefore the user may not wish to further invest in company A. A mutual fund that has performed well over time may include company A as a holding. The system 100 allows the user to leverage the financial expertise of the manager of the mutual fund without subjecting the user to unwanted risk that may be somewhat specific to the user. More particularly, most investors in the aforementioned mutual fund will not be employed at company A—therefore, the financial expert may include the company A as a holding in the mutual fund for the financial benefit of the general population. The customization component 104 can automatically modify the wealth management advice of the financial expert to create personalized wealth management advice (e.g., advice that facilitates creation of a personalized mutual fund) for the user.

The customization component 104 may employ a rules-based approach in connection with modifying wealth management advice from the financial expert based at least in part upon the personal investing preferences of the user. For instance, the customization component 104 may include a rules engine that comprises rules for a myriad of possible conflicts between advice from financial experts and personal investing preferences of users. For example, the financial expert may recommend purchasing stock in four different companies, and the personal investing preferences of the user may include a prohibition against purchasing stock in one of the companies. The customization component 104 can access a deterministic rule for such a situation and output the personalized wealth management advice 106 based upon the deterministic rule (e.g., allocate monies that would have been directed to the prohibited stock to the other investments in a pro rata manner).

In another example, the customization component 104 can use or include machine-learning algorithms in connection with outputting the personalized wealth management advice 106. For instance, the customization component 104 can use or include a Bayesian Belief network, a support vector machine, a regression tree, a k-nearest neighbor algorithm, other suitable machine learning algorithm, or a suitable combination thereof. In still yet another example, the customization component 104 can use some combination of a rules-based approach with a machine-learning approach in connection with determining the personalized wealth management advice 106.

The personalized wealth management advice 106 output by the customization component 104 may include data that supports the personalized wealth management advice. For instance, the customization component 104 may output an expected return on investment over a particular period of time, wherein such expected return on investment may be based at least in part upon performance history of recommended investments, current data, market trends, and/or the like. In another example, the customization component 104 can determine past performance of a financial expert selected by the user. Additionally, the customization component can use tax information pertaining to the user (e.g., current tax bracket) when determining the personalized wealth management advice 106, and may output tax consequences if the wealth management advice is followed or not followed. For instance, the customization component 104 may indicate to the user tax consequences of trading out of a first security and into a second security. In still yet another example, the customization component 104 can determine accumulated risk with respect to one or more investments in the portfolio of the user, expected profit with respect to one or more investments in the portfolio of the user, past performance of a financial expert, etc. The output component 108 can output such data.

Figure 2:
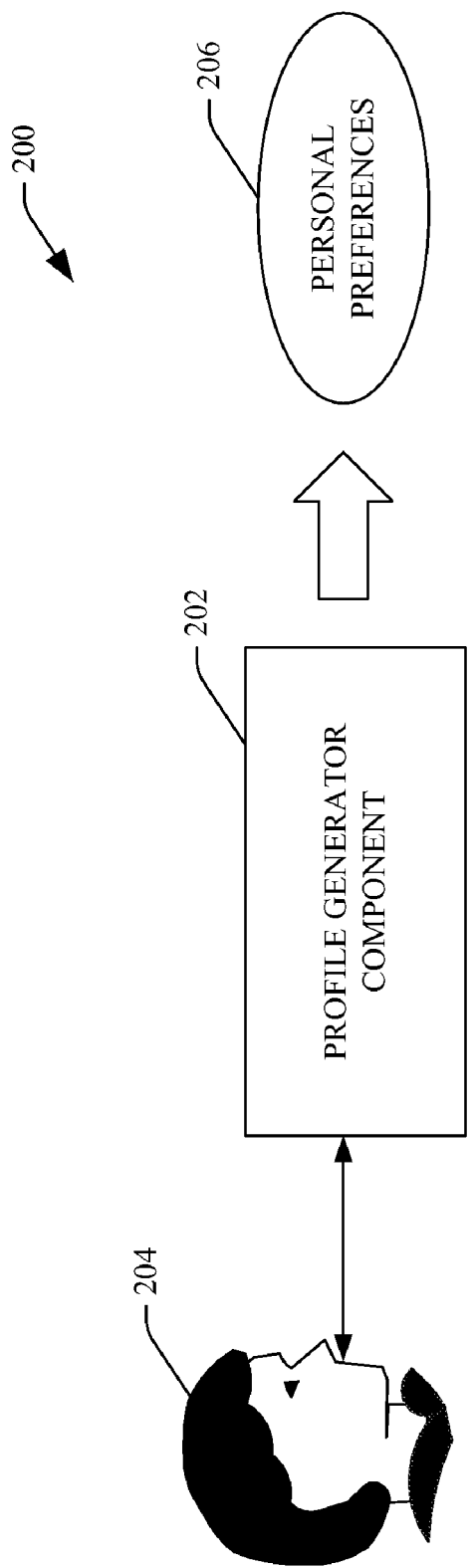
FIG. 2 is a functional block diagram of an example system that facilitates obtaining financial information from a user.

With reference now to FIG. 2, an example system 200 that facilitates determining personal investing preferences of a user is depicted. The system 200 includes a profile generator component 202 that can interact with a user 204 to obtain financial information pertaining to the user. For instance, the profile generator component may be a wizard or may be configured to output a wizard that is used to obtain financial data from a user. In an example, the profile generator component 202 can provide the user 204 with a series of questions, wherein a question presented to a user may be based at least in part upon an answer to a previous question provided by the user. The profile generator component 202 may obtain information such as current investment holdings of the user 204, current place of employment of the user 204, risk tolerance of the user 204, whether the user owns a house or leases a residence, current age of the user 204, desired retirement age of the user 204, annual income of the user 204, whether or not the user 204 has any children, and/or other information pertaining to the finances of the user 204.

Furthermore, the user 204 may provide the profile generator component 202 with explicit instructions, such as prohibitions on investing in certain securities, prohibitions on an amount of money (or a percentage of a portfolio of the user) invested in a particular security, instructions to ensure that at least a certain amount of money or percentage of a portfolio is invested in a certain security, etc. Thus, the profile generator component 202 can play a role that has been traditionally played by personal financial experts by gathering data pertinent to financial well-being of the user 204 and aiding the user in connection with determining the personal investing preferences 206 of the user.

Figure 3:
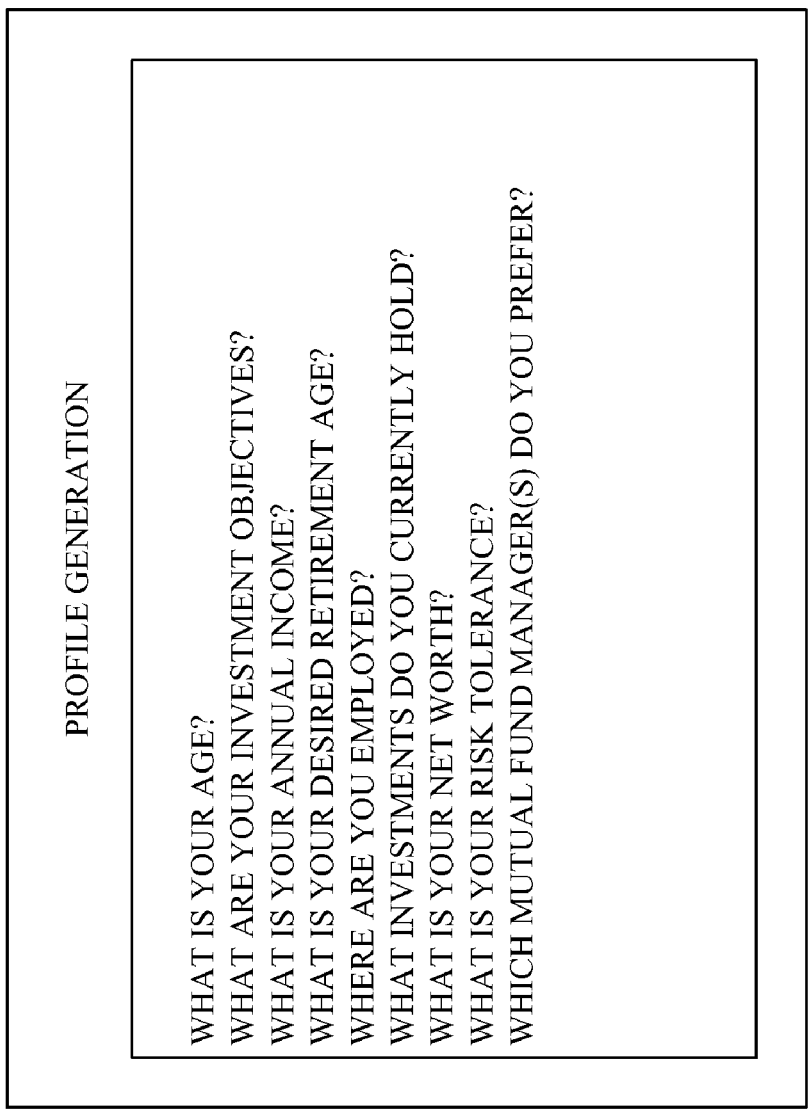
FIG. 3 is an example graphical user interface.

Turning briefly to FIG. 3, an example graphical user interface 300 that can be used in connection with obtaining information pertaining to the personal investing preferences of the user is illustrated. The graphical user interface 300 may present a plurality of questions to the user and can receive answers to the presented questions. For instance, while not shown, the graphical user interface 300 may include fields that correspond to the questions, where a user can provide answers to questions in such fields. In addition, the graphical user interface 300 may be a portion of a wizard, wherein a series of graphical user interfaces are presented to a user. Furthermore, more or fewer questions may be presented to a user. The graphical user interface 300 depicts but one of several possible examples of mechanisms that can be used to obtain information pertaining to personal investing preferences of the user.

Example questions depicted in the graphical user interface 300 include questions requesting an age of the user, investment objectives of the user, annual income of the user (e.g., which may be combined with a spouse of the user), desired retirement age of the user, place of employment of the user, current investment holdings of the user, current net worth of the user, risk tolerance of the user, and mutual funds or mutual fund managers preferred by the user. These questions, however, are but a few example questions that may be presented to a user, and other questions presented in a variety of orders can be used to obtain information from the user. Furthermore, the graphical user interface 300 may include slide bars, check boxes, or other tools that may be used to obtain information from the user.

Figure 4:
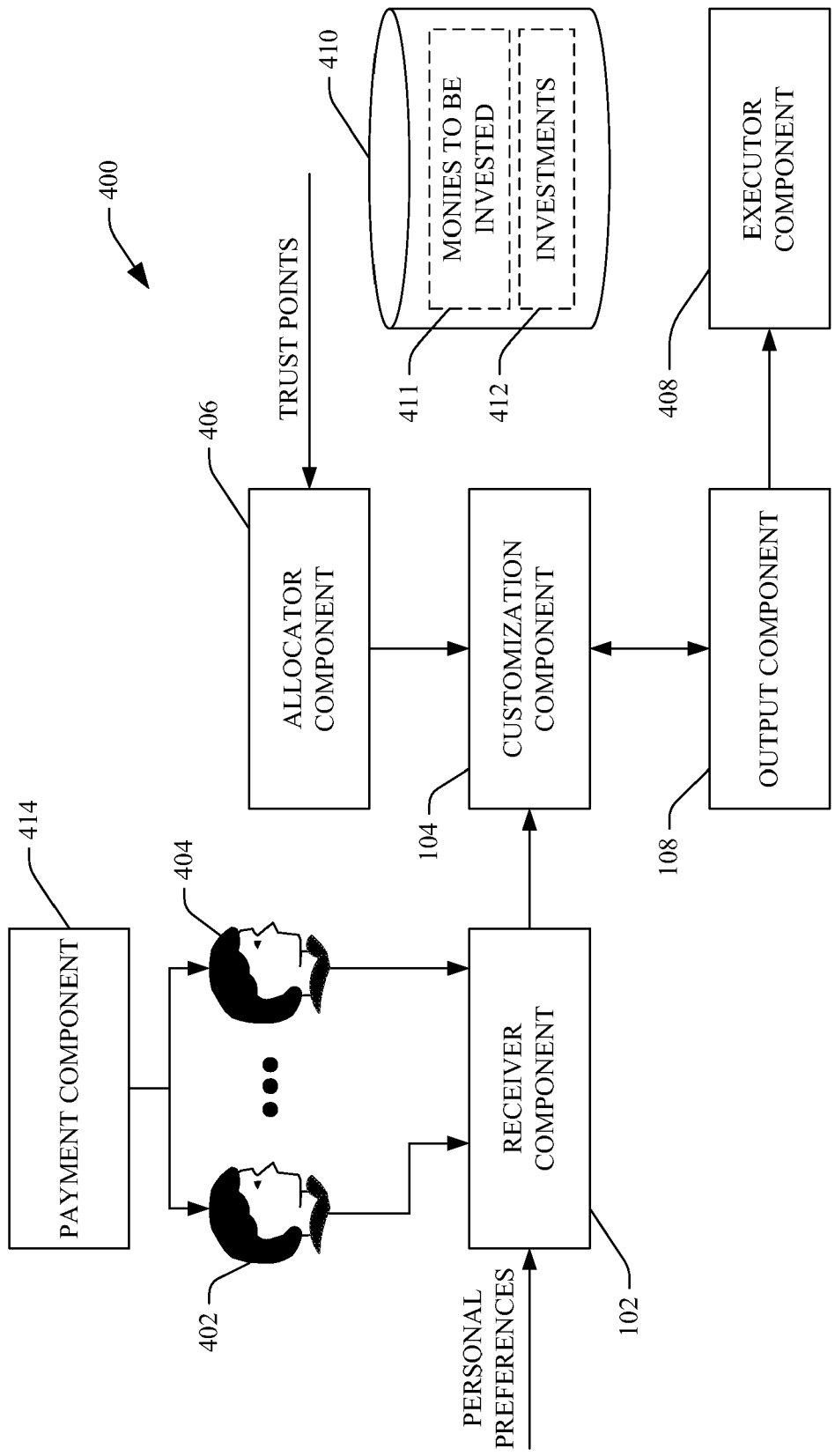
FIG. 4 is a functional block diagram of an example system that facilitates determining personalized wealth management advice for a user.

Referring now to FIG. 4, an example system 400 that facilitates generating and maintaining a personalized investment portfolio for a user is illustrated. The system 400 may include the receiver component 102 that can receive personal investing preferences (e.g., from a user or that are based upon information obtained from a user). Furthermore, the receiver component 102 may receive wealth management advice from a plurality of financial experts 402-404, wherein the financial experts 402-404 have been identified by the user. For instance, the user may select several mutual funds and a hedge fund (e.g., a small cap mutual fund, a large cap mutual fund, and a hedge fund), and therefore can identify the financial experts that manage such funds. The wealth management advice received by the receiver component 102 can be, for instance, holdings of funds managed by the financial experts 402-404. In addition, the wealth management advice received by the receiver component 102 may be trades/exchanges made to funds managed by the financial experts 402-404.

The system 400 may further include an allocator component 406 that receives an assignment of trust points to the experts 402-404 from a user and allocates the trust points to the financial experts 402-404 in accordance with the assignment. For instance, the plurality of financial experts 402-404 may include two financial experts. The user may, out of a total of one hundred trust points, assign seventy five trust points to a first financial expert and may assign twenty five trust points to a second financial expert. Thus, the user wishes that greater deference be provided with respect to advice from first financial expert when compared to advice from the second financial expert.

The customization component 104 can receive the personal investing preferences of the user and the wealth management advice (from each of the plurality of financial experts 402-404) from the receiver component 102, and can receive an allocation of trust points amongst the plurality of financial experts 402-404 from the allocator component 406, and can generate personalized wealth management advice for the user. In an example, the personalized wealth management advice can be partitioned in accordance with a number of financial experts selected by the user. Thus, for instance, the customization component 104 can output first personalized wealth management advice that corresponds to wealth management advice received from a first financial expert; the customization component 104 can output second personalized wealth management advice that corresponds to wealth management advice received from a second financial expert, etc. Thus, for instance, the wealth management advice determined by customization component 104 may include a first personalized mutual fund that corresponds to a mutual fund managed by the first financial expert (modified in accordance with the personal investing preferences of the user), a second personalized mutual fund that corresponds to a mutual fund managed by the second financial expert, etc. A number of trust points assigned to a respective financial expert may be indicative of a percentage of a total amount of a portfolio of the user that is recommended to be invested in the personalized mutual fund that corresponds to the mutual fund managed by the respective financial expert.

Additionally or alternatively, the customization component 104 can output collective personalized wealth management advice that is based at least in part upon collective advice received from the financial experts 402-404. Pursuant to an example, the user may wish to prohibit any particular security (security A) from making up more than five percent of the investment portfolio. A first financial expert may manage a first mutual fund that includes security A, wherein security A makes up four percent of the first mutual fund. A second financial expert may manage a second mutual fund that includes security A, wherein security A makes up three percent of the second mutual fund. Individually, the wealth management advice provided by the financial experts does not violate the personal investing preferences of the user; however, collectively, if the advice of the financial experts were to be followed, security A would make up over five percent of the investment portfolio of the user (in violation of the personal investing preferences of the user). The customization component 104 can automatically modify wealth management advice from one or more financial experts based upon the collective advice of such experts in view of the personal investing preferences of the user and trust points allocated to each of the experts.

The system 400 may additionally include the output component 108, which can receive the personalized wealth management advice and output such advice. For instance, the output component 108 may output the personalized wealth management advice to a data store. The system 400 may also include an executor component 408 that can automatically execute one or more investment transactions (e.g., trades) based at least in part upon the personalized wealth management advice that has been output by the output component 108.

Pursuant to an example, the user may have monies and/or investments that are accessible to the system 400 in general and are accessible to the executor component 408 in particular. For purposes of explanation, a data store 410 is depicted that may include data pertaining to current investments of the user as well as monies that are available for investment by the user. Thus, the system 400 can host an online savings account and may also act as an online broker (e.g., the system may operate within bounds of relevant banking/brokerage laws).

In an example, the user may transfer monies to an account that is accessible by the executor component 408, shown in FIG. 4 as monies to be invested 411. Upon receipt of a user command (e.g., some indication that the user wishes to transfer monies from the monies to be invested 411 into other investments), monies can be transferred into investments based at least in part upon the personalized wealth management advice determined by the customization component 104 (which is based at least in part upon the personal investing preferences of the user, the received wealth management advice from the financial experts 402-404, and a number of trust points allocated to each of the financial experts). In a specific example, the user may have $10,000 to invest, and may select four different mutual funds (and thus four different mutual fund managers). The user, in this example, can distribute trust points evenly amongst the four different mutual fund managers. The customization component 104 can determine personalized wealth management advice as described above, and the output component 108 can output the personalized wealth management advice which can be received by the executor component 408. The user may indicate that she wishes to invest the $10,000, and the executor component 408 can purchase $10,000 worth of investments in accordance with the personalized wealth management advice.

In another example, the executor component 408 may have access to investments that have been purchased by way of the system 400. Continuing with the above example, the user, in essence, may have monies invested in four different "personalized" mutual funds by way of the system 400. Monies invested by way of the system are illustrated as investments 412. Mutual fund managers, however, often alter holdings of mutual funds based on market trends, sales data, etc. When a mutual fund manager selected by the user alters holdings in a corresponding mutual fund, the customization component 104 can modify the personalized wealth management advice. The executor component 408 may then automatically alter holdings in the investments 412 based at least in part upon the advice of the mutual fund manager. In another example, the executor component 408 may only alter holdings of the user upon receipt of user input.

In still yet another example, the executor component 408 can transfer investments in accordance with user input. For instance, a user may wish to cease receiving first wealth management advice from a first financial expert and may further wish to begin receiving second wealth management advice from a second financial expert. In addition, the user may wish to transfer current holdings that were purchased in accordance with the first wealth management advice to holdings that are in accordance with the second wealth management advice. Conventionally, if a user were to transfer all monies from a first mutual fund to a second mutual fund, the user must sell all shares of the first mutual fund and then purchase shares of the second mutual fund with the monies from the sale of the first mutual fund. This is the case even if the first and second mutual funds have significant overlap in investment holdings. The executor component 408 can make exchanges only between holdings that differ, possibly resulting in tax benefits to the user.

Conventionally, financial experts are given fees for providing financial advice (e.g., for managing mutual funds). To continue to provide the financial experts with revenue (while not investing directly in mutual funds, hedge funds, etc. managed by the financial experts), the system 400 may include a payment component 414 that can automatically provide payment to the financial experts 402-404 for wealth management advice. For instance, a certain percentage of monies invested based at least in part upon wealth management advice provided by a financial expert can be provided to the financial expert by the payment component 414. In another example, the financial experts 402-404 may be paid by the payment component 414 on a yearly salary. In still yet another example, the financial experts 402-404 may be paid by the payment component 414 in accordance with performance of investments recommended by the financial experts 402-404. In yet another example, the financial experts 402-404 may be paid by the payment component 414 based at least in part upon a fee schedule of the financial expert. Further, any suitable combination of the aforementioned mechanisms for paying the financial experts 402-404 are contemplated, along with other manners for paying the financial experts 402-404.

The system 400, then, may act as a personal financial adviser to the user, which has heretofore only been available to those of significant wealth. Investment risk of the user may be reduced without negatively impacting possible investment returns (e.g., the customization component 104 may substantially optimize a risk/return ratio when determining the personalized wealth management advice), resulting in additional wealth for the user.

Figure 5:
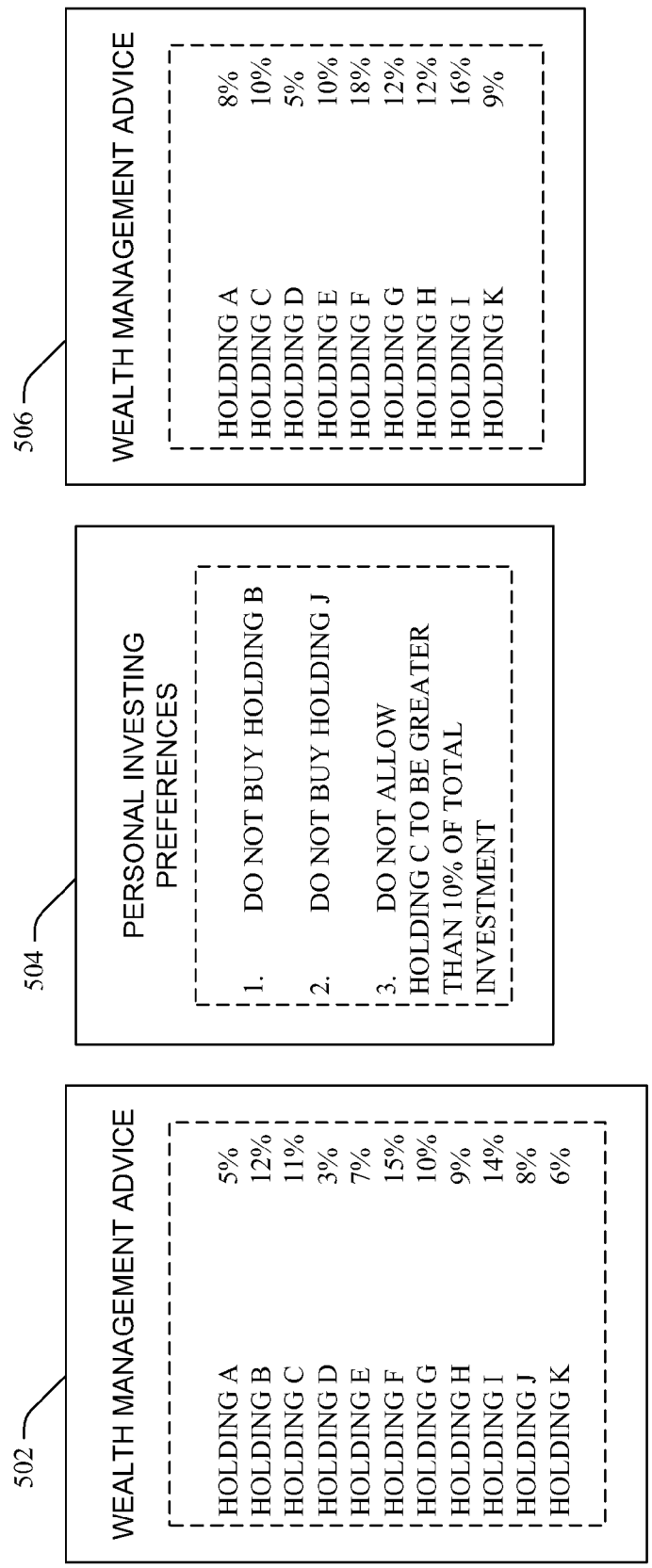
FIG. 5 depicts an example customization of wealth management advice from an expert based at least in part upon personal financial preferences of a user.

Referring now to FIG. 5, an example modification 500 of wealth management advice as provided by a financial expert based at least in part upon personal financial preferences of a user is depicted. In this example, wealth management advice 502 may be provided by a mutual fund manager that manages a mutual fund with particular holdings that make up specific percentages of the mutual fund. Specifically, the mutual fund may include several investment holdings A-K, wherein the holdings make up 5, 12, 11, 3, 7, 15, 10, 9, 14, 8, and 6 percent of the mutual fund, respectively. Therefore, for a general population the mutual fund manager believes that investing in the aforementioned holdings at the above percentages is optimal for the general population.

As noted above, however, what is optimal for the general population may not be optimal for a specific user. Accordingly, the user may have personal investing preferences 504 that can be used to alter the wealth management advice 502 provided by the financial expert. For instance, the personal investing preferences 504 may include a prohibition on investing in holding B, a prohibition on investing in holding J, and a prohibition on investing more than 10% of a total investment in holding C.

The customization component 104 (FIG. 1) can modify the wealth management advice 502 provided by the financial expert such that personalized wealth management advice 506 is in accordance with the personal investing preferences of the user. In this example, resulting personalized wealth management advice includes advice to purchase holdings A, C, D, E, F, G, H, I, and K at 8, 10, 5, 10, 18, 12, 12, 16, and 9 percent of a total investment, for example. As noted above, the executor component 408 can purchase holdings in the determined percentages to create a personalized mutual fund for the user.

Figure 6:
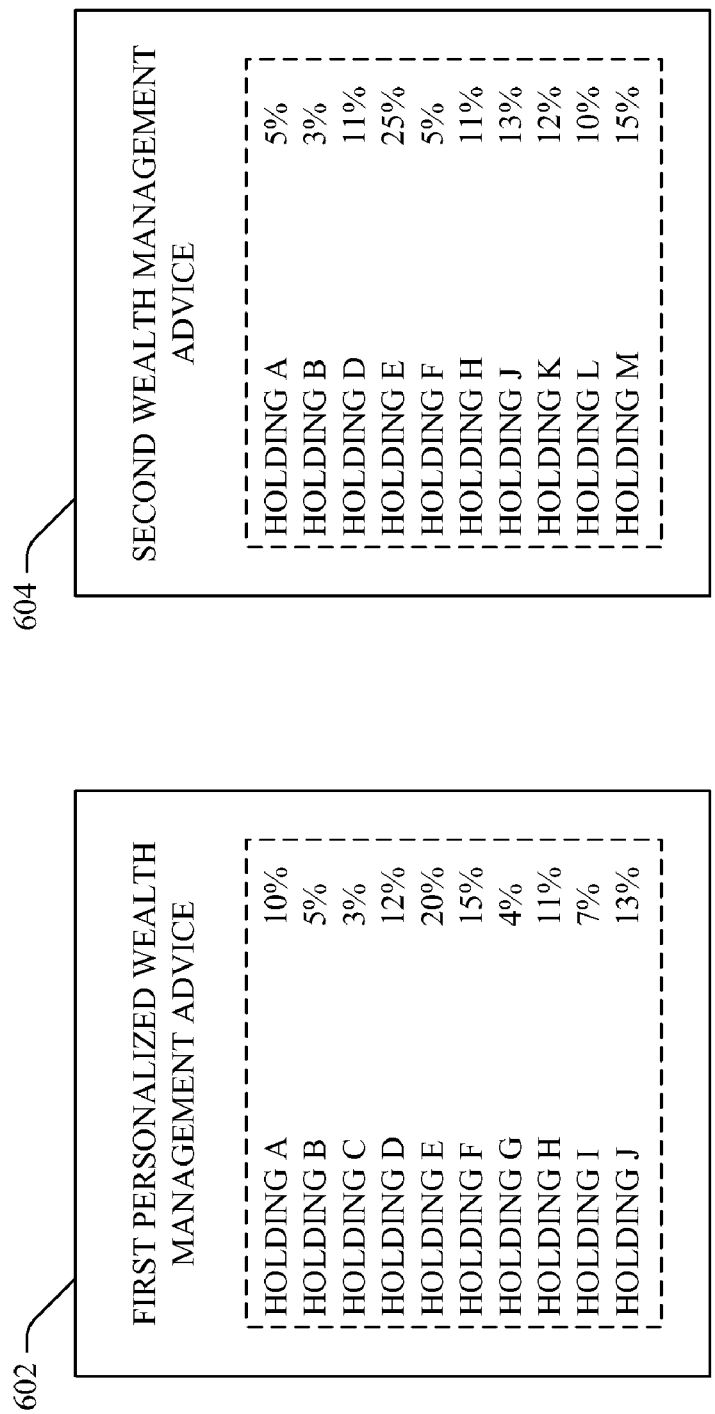
FIG. 6 depicts an example exchange of holdings.

Referring now to FIG. 6, an example of a transaction that can be undertaken by the executor component 408 (FIG. 4) is illustrated. In this example, the user may have purchased investments in accordance with first personalized wealth management advice 602, which may be based at least in part upon wealth management advice from a first financial expert. For instance, holdings in the first personalized wealth management advice 602 (e.g., a first personalized mutual fund) may include holdings A-J invested at 10, 5, 3, 12, 20, 15, 4, 11, 7, and 13 percent of a total amount invested in accordance with the first personalized wealth management advice. The user, however, may wish to cease investing in accordance with advice from the first financial expert, and may wish to transfer investments made in accordance with wealth management advice from the first financial expert to investments that are based at least in part upon wealth management advice from a second financial expert.

The customization component 104 (FIG. 1) can determine second personalized wealth management advice 604 based at least in part upon personalized investing preferences of the user and wealth management advice from the second financial expert. In this example, the second wealth management advice 604 includes holdings A, B, D, E, F, H, J, K, L, and M, wherein it is recommended to invest 5, 3, 11, 25, 5, 11, 13, 12, 10, and 15 percent of a total amount invested in accordance with the second personalized wealth management advice 604 in the aforementioned holdings, respectively.

The executor component 408 can transfer holdings of the user from holdings in the first personalized wealth management advice 602 to holdings in the second personalized wealth management advice 604. Rather than selling all holdings that are invested in based at least in part upon the first personalized wealth management advice 602, however, the executor component 408 can execute trades that amongst portions of the first and second personalized wealth management advice 602 and 604 that are different. More specifically, the first and second personalized wealth management advice 602 and 604 share holdings A, B, D, E, F, H, and J in common. Accordingly, the executor component 408 need not sell out of such holdings entirely, but instead can undertake only transactions that are requisite to create a customized mutual fund in accordance with the second personalized wealth management advice 604.

Figure 7:
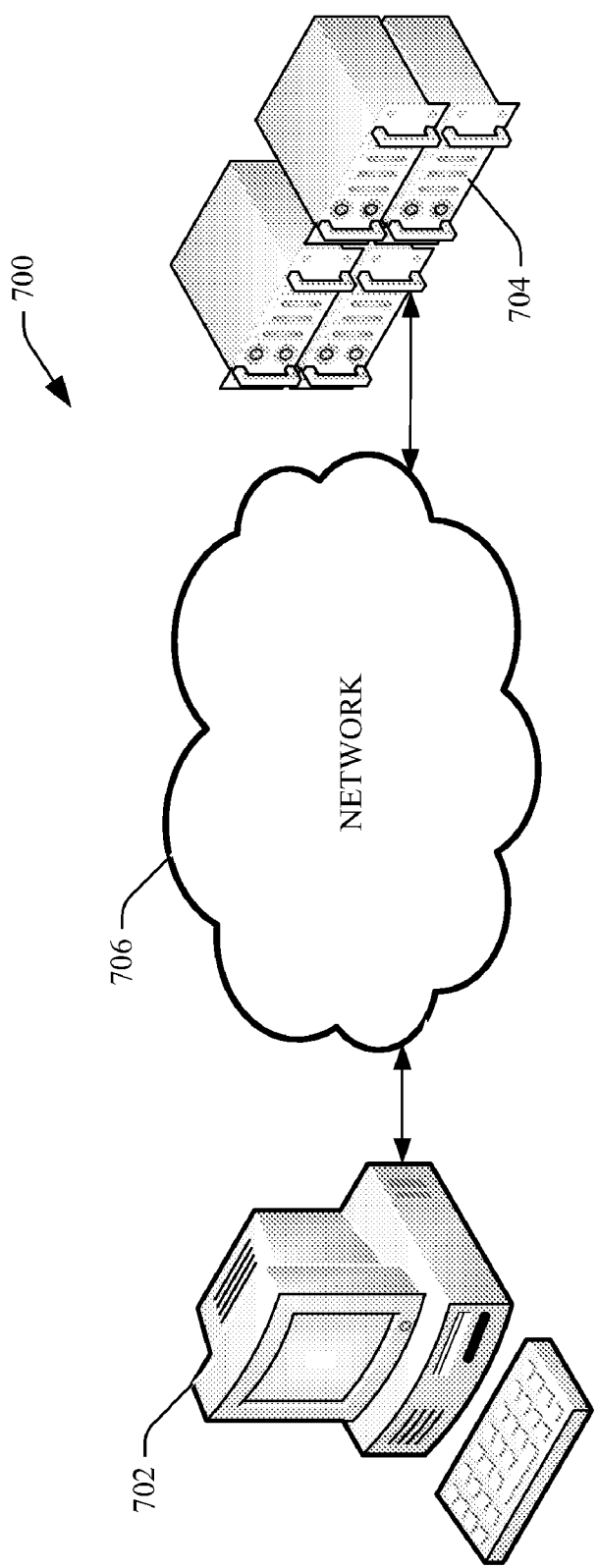
FIG. 7 illustrates an example computing environment.

With reference now to FIG. 7, an example computing environment 700 is illustrated. The computing environment 700 includes a client computing device 702. The client computing device 702 may be a personal computer, a laptop computer, a personal digital assistant, a smart phone, or other suitable computing device. The computing environment 700 may additionally include a server 704 that can retain, for instance, the system 400 (FIG. 4). The client computing device 702 can access the server 704 by way of a network 706, such as the Internet.

Pursuant to an example, a user may open a web browser on the client computing device 702 and direct the browser to a website that is hosted by the server 704. Such website may include a graphical user interface that facilitates a first-time user setting up a new account. In another example, the website may include a field that can receive a username, a password, a personal identification number, and/or the like for a returning user. The website may additionally facilitate receipt of information pertaining to financial preferences of the user, may facilitate receipt of a user-selection of a financial expert (e.g., through selection of a particular mutual fund, hedge fund, . . . ). The website may additionally include options to invest monies with respect to certain personalized wealth management advice. Thus, any user that can access the Internet can have the ability to utilize the aspects described herein.

With reference now to FIGS. 8-11, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 8:
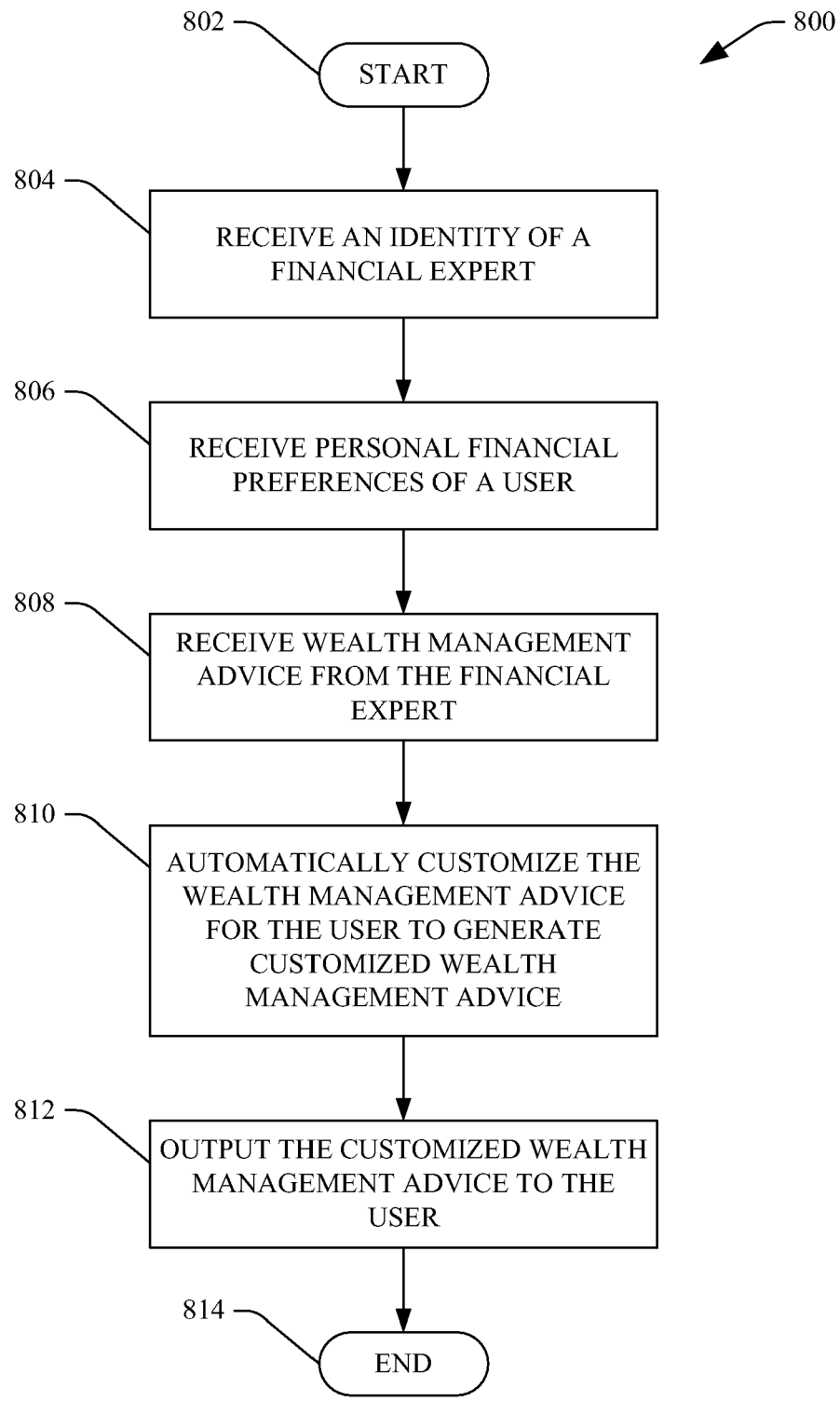
FIG. 8 is flow diagram that illustrates an example methodology for determining and outputting customized wealth management advice for a user.

Referring now to FIG. 8, an example methodology 800 that facilitates outputting customized wealth management advice to a user is illustrated. The methodology 800 starts at 802, and at 804 an identity of a financial expert is received, wherein the financial expert has been identified by a user. For instance, the user may select (identify) a mutual fund, and by extension identify a mutual fund manager (the financial expert).

At 806, personal financial preferences of the user are received. As noted above, the personal financial preferences may include a prohibition against purchasing a particular security, risk tolerance of the user, amongst other information. At 808, wealth management advice is received from the financial expert. For instance, if the financial expert is a mutual fund manager, the wealth management advice may include securities that a mutual fund managed by the financial expert holds. In another example, if the financial expert is a mutual fund manager, the wealth management advice may include changes in positions of holdings in the mutual fund in real-time.

At 810, the wealth management advice received from the financial expert is automatically customized for the user based at least in part upon the personal financial preferences of the user received at 806 to generate customized wealth management advice (e.g., customized for the user). Such customized wealth management advice, for instance, may be used in connection with generating and maintaining a customized mutual fund for the user. At 812, the customized wealth management advice is output, wherein the wealth management advice may be output to a printer, to a computer-readable medium, to a graphical user interface, and/or the like.

Pursuant to an example, the output wealth management advice may includes advice to purchase a first investment and advice to purchase a second investment. However, purchasing the first investment may be in contrast to the personal preferences of the user received at 806. Accordingly, at least a portion of monies that was to be invested in the first investment in accordance with the advice of the financial expert can be allocated to the second investment. The methodology 800 completes at 814.

Figure 9:
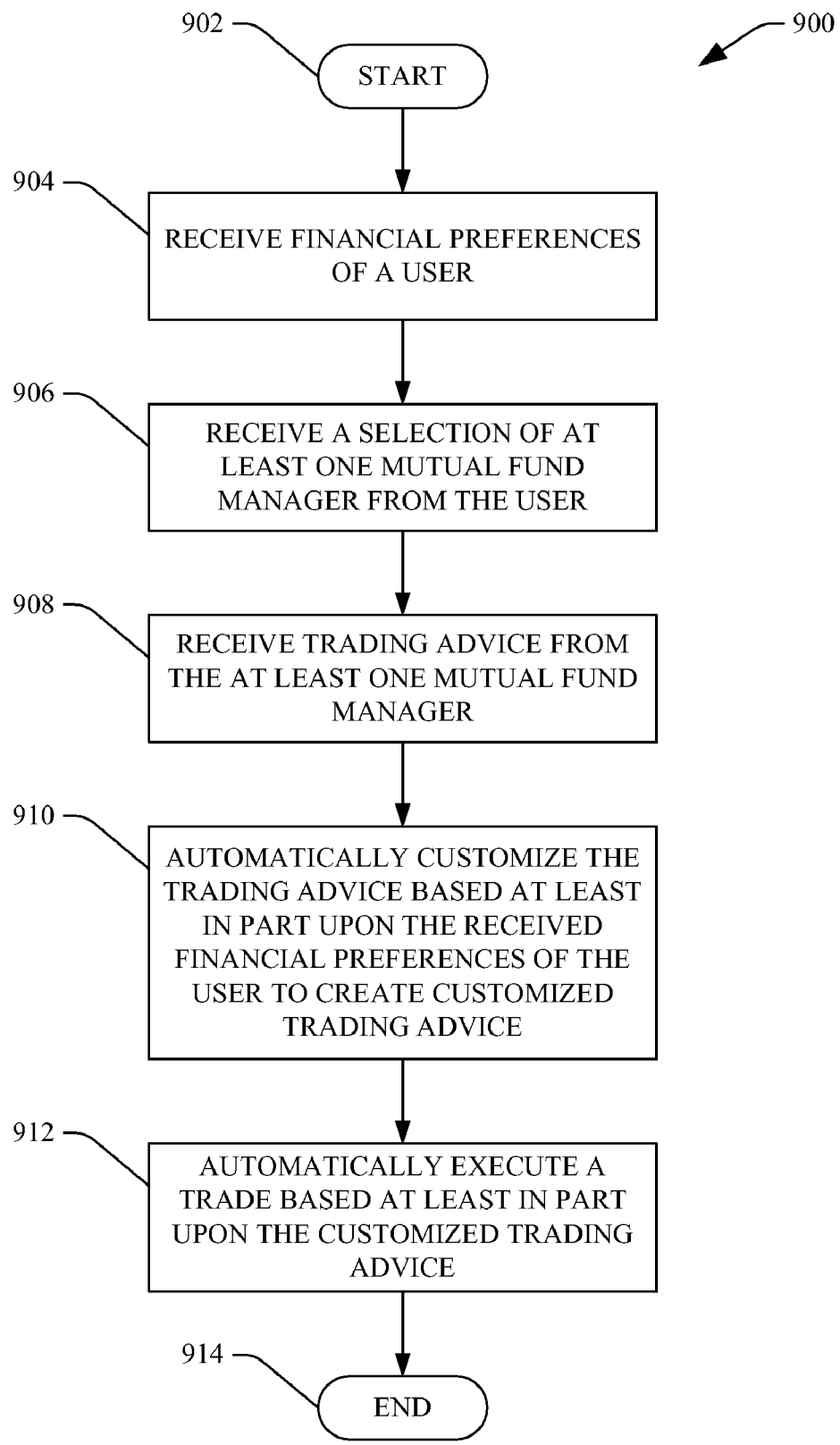
FIG. 9 is a flow diagram that illustrates an example methodology for automatically executing a trade based at least in part upon customized wealth management advice.

Referring now to FIG. 9, an example methodology 900 that facilitates automatically executing a securities trade is illustrated. The methodology 900 starts at 902, and at 904 financial preferences of a user are received. At 906, a selection from the user of at least one mutual fund manager is received. For instance, the user may select a particular mutual fund from a list of available mutual funds, and by extension select a manager of a mutual fund.

At 908, trading advice is received from the at least one mutual fund manager. For example, the mutual fund manager may recommend a change in holdings in a mutual fund. For instance, the mutual fund manager may recommend removing security A from the mutual fund and replacing it with security B.

At 910, the trading advice is automatically customized based at least in part upon the received financial preferences of the user to create customized trading advice. At 912, a trade is automatically executed based at least in part upon the customized trading advice. In an example, a customized mutual fund may be created for the user, wherein the customized mutual fund is based at least in part upon a mutual fund managed by the aforementioned mutual fund manager. When the mutual fund manager changes holdings in the mutual fund, a trade can be automatically executed in the customized mutual fund of the user (in accordance with the financial preferences of the user). The methodology 900 completes at 914.

Figure 10:
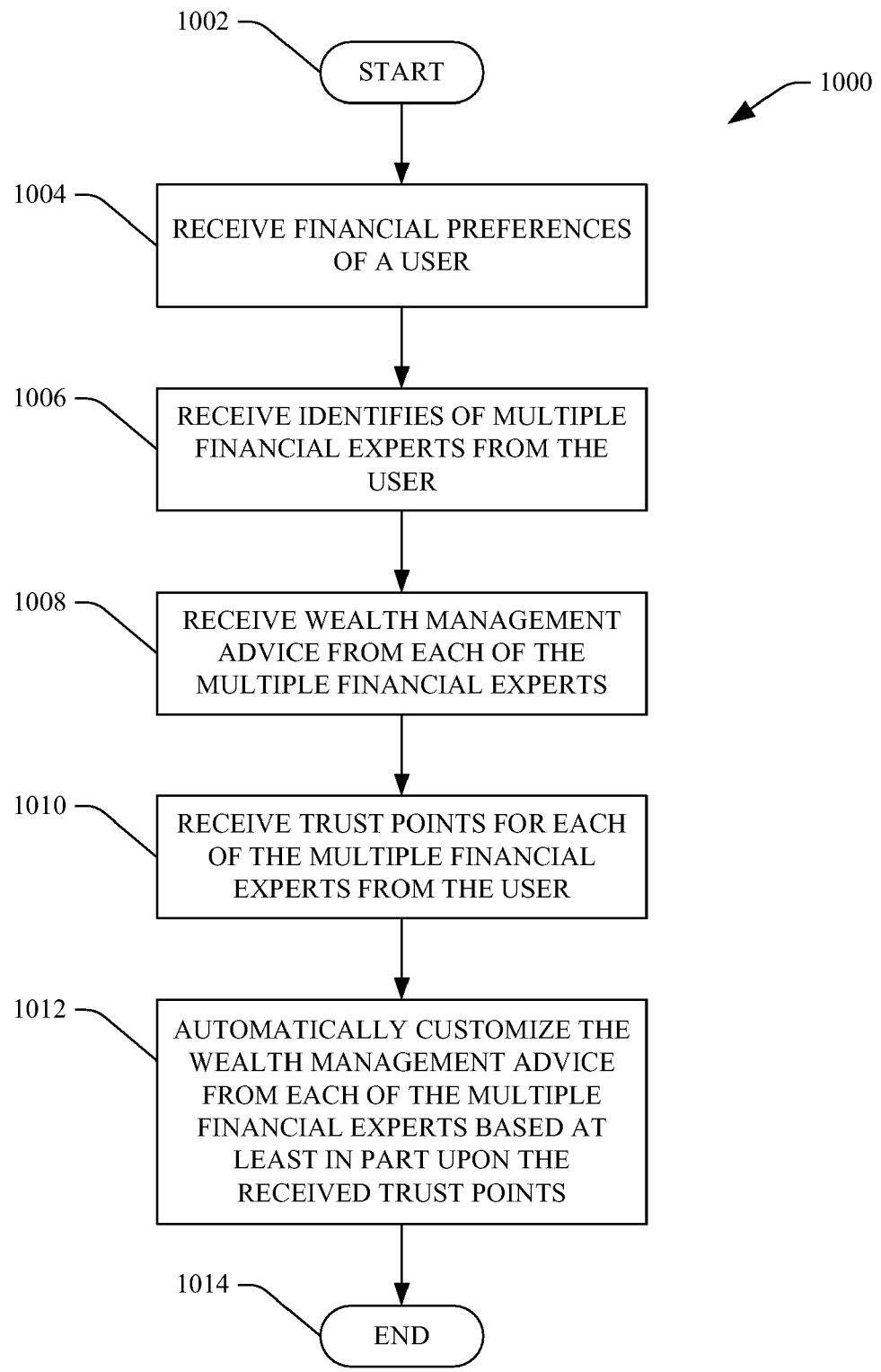
FIG. 10 is a flow diagram that illustrates an example methodology for automatically customizing wealth management advice from each of a plurality of financial experts.

Turning now to FIG. 10, an example methodology 1000 that facilitates generating customized wealth management advice is illustrated. The methodology 1000 starts at 1002, and at 1004 financial preferences of a user are received. At 1006 identities of multiple financial experts are received, wherein the multiple financial experts are selected/identified by the user. For instance, the user may wish to invest in a small cap mutual fund, a mid cap mutual fund, and a large cap mutual fund. Accordingly, the user may identify funds of the aforementioned type, and by extension identify the managers of such funds.

At 1008, wealth management advice is received from each of the multiple financial experts. At 1010, trust points are received from the user for each of the multiple financial experts. At 1012, wealth management advice from each of the multiple financial experts is automatically customized based at least in part upon the received trust points. The methodology 1000 completes at 1014.

Figure 11:
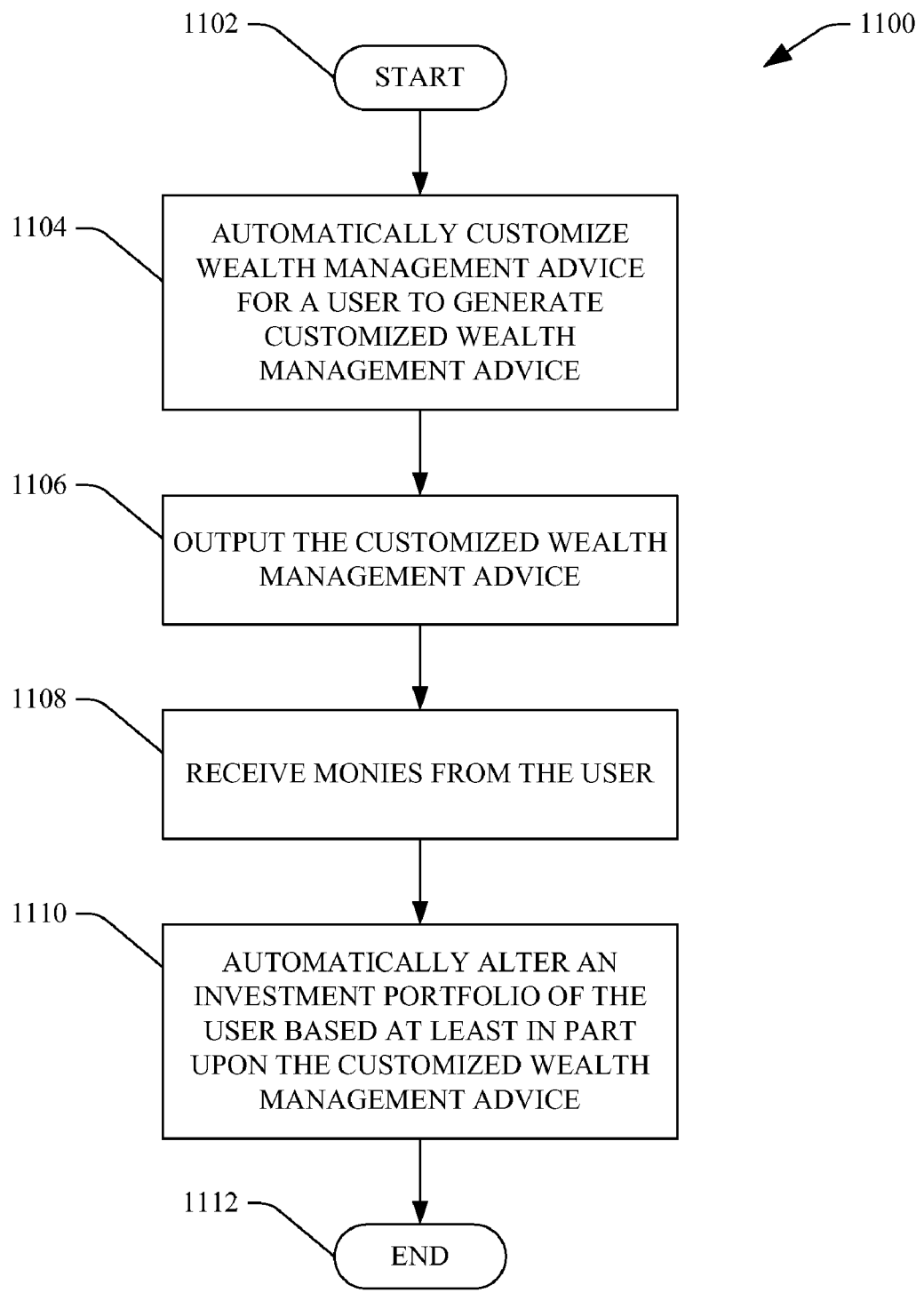
FIG. 11 is a flow diagram that illustrates an example methodology for automatically altering an investment portfolio of a user based at least in part upon customized wealth management advice.

Referring now to FIG. 11, an example methodology 1100 for automatically altering an investment portfolio of a user is illustrated. The methodology 1100 starts at 1102, and at 1104 wealth management advice from a financial expert is automatically customized for a user to generate customized wealth management advice. At 1106, the customized wealth management advice is output (e.g., output to a computer-readable medium). At 1108, monies are received from the user. For instance, the monies may be electronic funds that are in an online account. At 1110, an investment portfolio of the user is automatically altered based at least in part upon the customized wealth management advice. The methodology 1100 completes at 1110.

Figure 12:
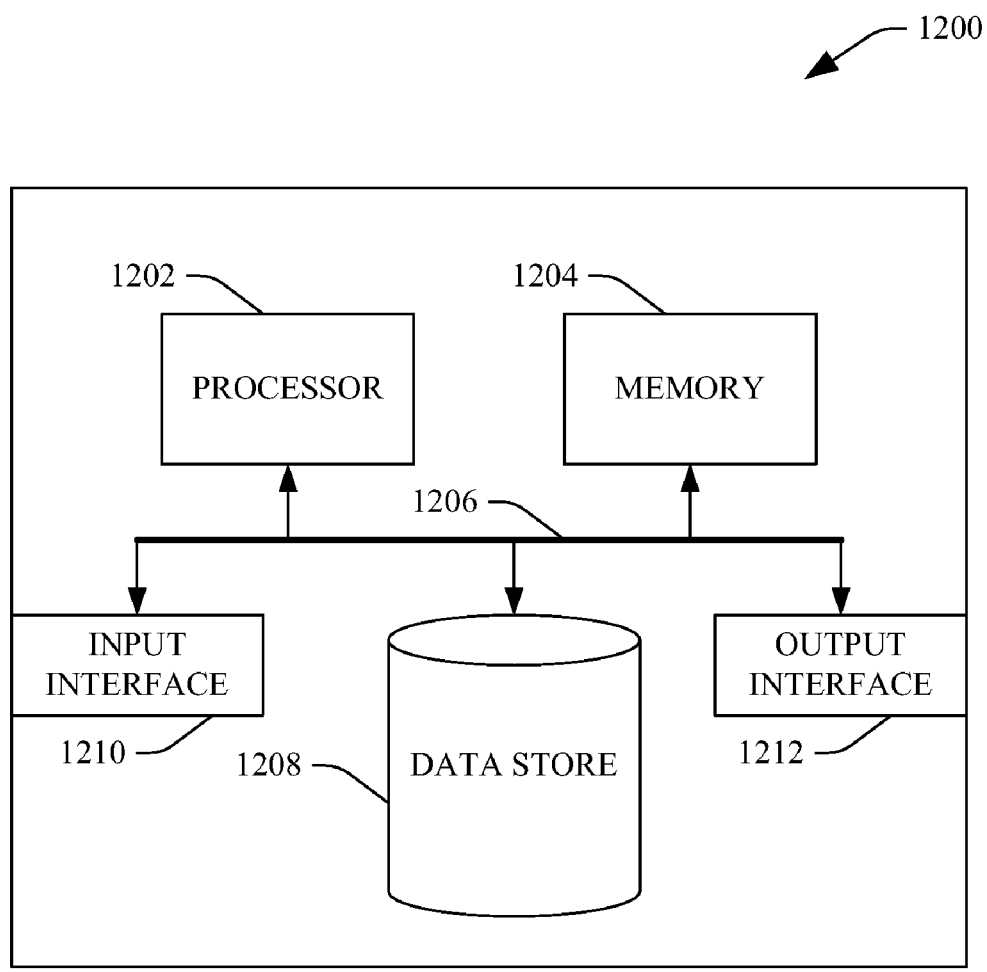
FIG. 12 is an example computing system.

Now referring to FIG. 12, a high-level illustration of an example computing device 1200 that can be used in accordance with the systems and methodologies disclosed herein is illustrated. For instance, the computing device 1200 may be used in a system that can be used to generate and/or maintain a customized investment portfolio. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory by way of a system bus 1206. In addition to storing executable instructions, the memory 1204 may also store images, graphics, etc.

The computing device 1200 additionally includes a data store 1208 that is accessible by the processor 1202 by way of the system bus 1206. The data store 1208 may include executable instructions, identities of financial experts, wealth management advice, etc. The computing device 1200 also includes an input interface 1210 that allows external devices to communicate with the computing device 1200. For instance, the input interface 1210 may be used to receive instructions from an external computer device, receive wealth management advice from an outside source, etc. The computing device 1200 also includes an output interface 1212 that interfaces the computing device 1200 with one or more external devices. For example, the computing device 1200 may transmit data to a personal computer by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving an identity of a financial expert on a computer, wherein the financial expert has been identified by a user, wherein the financial expert is a mutual fund manager;
   receiving personal financial preferences of the user on the computer, wherein the personal financial preferences include a prohibition against purchasing a particular investment;
   receiving wealth management advice from the financial expert as provided to a general population on the computer, wherein the wealth management advice includes purchasing the particular investment and a plurality of other investments;
   automatically customizing the wealth management advice for the user using the computer based at least in part upon the received personal financial preferences of the user to generate customized wealth management advice, wherein the customized wealth management advice includes advice to purchase the plurality of other investments but does not include advice to purchase the particular investment; and
   outputting the customized wealth management advice on the computer.

2. The method of claim 1, further comprising automatically purchasing at least one investment for the user based at least in part upon the output customized wealth management advice.

3. The method of claim 1, further comprising automatically customizing the wealth management advice to substantially optimize a risk/return ratio for the user.

4. The method of claim 1, further comprising:
   receiving identities of multiple financial experts, wherein each of the multiple financial experts has been identified by the user;
   receiving wealth management advice from each of the multiple financial experts, wherein wealth management advice received from different financial experts is different; and
   automatically customizing the wealth management advice from each of the multiple financial experts based at least in part upon the personal financial preferences of the user.

5. The method of claim 4, further comprising:
   receiving trust points for each of the multiple financial experts from the user, wherein each of the multiple financial experts is individually assigned one or more trust points; and
   automatically customizing the wealth management advice from each of the multiple financial experts to generate the customized wealth management advice based at least in part upon the received trust points.

6. The method of claim 5, further comprising:
   receiving monies from the user; and
   purchasing multiple investments for the user using the received monies, wherein investments selected for purchase are based at least in part upon the customized wealth management advice.

7. The method of claim 5, further comprising providing the financial expert with a fee for the received wealth management advice, wherein the fee is based at least in part upon a number of trust points assigned to the financial expert, an amount of money the user has invested based at least in part upon the customized wealth management advice, and a fee schedule of the financial expert.

8. The method of claim 1, wherein the wealth management advice is based at least in part upon tax data pertaining to the user.

9. The method of claim 1, further comprising receiving an indication from the user that trades are to be made in accordance with the customized wealth management advice.

10. The method of claim 1, further comprising:
    receiving wealth management advice from a second financial expert;
    analyzing collective risk with respect to the wealth management advice from the first financial expert and the second financial expert; and
    outputting the customized financial advice based at least in part upon the analyzed collective risk.

11. The method of claim 1, wherein the wealth management advice includes advice to purchase a first investment and advice to purchase a second investment, wherein purchasing the first investment is in contrast to the personal preferences of the user, and further comprising allocating at least a portion of monies that was to be invested in the first investment in accordance with the advice of the financial expert to the second investment.

12. The method of claim 1, wherein the personal financial preferences of the user includes current tax bracket of the user.

13. The method of claim 1, further comprising outputting past performance of the financial expert, expected profit, and accumulated risk.

14. The method of claim 1, wherein the customized wealth management advice is a customized mutual fund that is based at least in part upon a mutual fund managed by the mutual fund manager.

15. A system that comprises the following computer-executable components:
    a receiver component that receives:
      personal preferences of a user regarding wealth management;
      first wealth management advice from a first financial expert that has been selected by the user; and
      second wealth management advice from a second financial expert that has been identified by the user;
    a customization component that automatically modifies the first wealth management advice from the first financial expert based at least in part upon the received personal preferences of the user to generate first personalized wealth management advice, wherein the customization component is configured to modify the second wealth management advice from the second financial expert based at least in part upon the received personal preferences of the user to generate second personalized wealth management advice;
    an allocator component that receives assignments of trust points to the first and second financial experts from the user and allocates trust points to the first and second financial experts based at least in part upon the received assignments;
    an executor component that executes trades based at least in part upon the first personalized wealth management advice, the second personalized wealth management advice, and the allocated trust points to the first and second financial experts; and
    an output component that outputs the personalized wealth management advice.

16. The system of claim 15, further comprising a profile generator component that obtains information pertaining to finances of the user to facilitate determining the personal preferences of the user.

17. The system of claim 15, wherein the executor component automatically executes a trade to alter holdings in an investment portfolio of the user upon receiving an indication that the first financial expert has recommended an alteration in holdings of a mutual fund managed by the first financial expert.

18. The system of claim 15, wherein at least one of the first financial expert or the second financial expert is a mutual fund manager.

19. A computer-readable medium comprising instructions that, when executed by a processor, cause the processor to perform acts comprising:

receive financial preferences of a user;

receive a selection from the user of at least one mutual fund manager that manages a mutual fund that comprises a plurality of holdings, wherein the mutual fund is investable to a plurality individuals;

receive trading advice from the at least one mutual fund manager;

automatically customize the trading advice based at least in part upon the received financial preferences of the user to create customized trading advice; and automatically execute a trade based at least in part upon the customized trading advice.

20. The computer-readable medium of claim 19, wherein the trading advice includes advice to purchase a first investment and advice to purchase a second investment, wherein purchasing the first investment is in contrast to the financial preferences of the user, and further comprising allocating at least a portion of monies that was to be invested in the first investment in accordance with the advice of the mutual fund manager to the second investment.

* * * * *